United States Patent
Bryning et al.

(10) Patent No.: US 8,570,636 B2
(45) Date of Patent: Oct. 29, 2013

(54) SYSTEMS, METHODS AND COMPOSITIONS RELATING TO DISPLAY ELEMENTS

(75) Inventors: Mateusz Bryning, Campbell, CA (US); Zbigniew Bryning, Campbell, CA (US); Remy Cromer, Saratoga, CA (US)

(73) Assignee: Zikon Inc., San Jose, CA (US)

( * ) Notice: Subject to any disclaimer, the term of this patent is extended or adjusted under 35 U.S.C. 154(b) by 1436 days.

(21) Appl. No.: 12/105,927

(22) Filed: Apr. 18, 2008

(65) Prior Publication Data
US 2009/0322669 A1    Dec. 31, 2009

(51) Int. Cl.
*G02F 1/03* (2006.01)
*G02B 26/00* (2006.01)
*G09G 3/34* (2006.01)
*G03G 13/00* (2006.01)

(52) U.S. Cl.
USPC ............. 359/254; 359/237; 345/107; 430/31

(58) Field of Classification Search
USPC ............ 359/254, 296, 237, 245, 290; 349/33; 345/49, 105, 107; 430/31–32; 204/450, 204/600; 250/70, 208.1; 438/929
See application file for complete search history.

(56) References Cited

U.S. PATENT DOCUMENTS

| | | | |
|---|---|---|---|
| 4,419,663 A | 12/1983 | Kohashi | |
| 5,582,700 A | 12/1996 | Bryning et al. | |
| 5,961,804 A * | 10/1999 | Jacobson et al. | 204/606 |
| 6,542,284 B2 * | 4/2003 | Ogawa | 359/296 |
| 7,116,467 B2 | 10/2006 | Kornbrekke et al. | |
| 2005/0270267 A1 | 12/2005 | Johnson | |
| 2007/0095666 A1 * | 5/2007 | Lau et al. | 204/450 |
| 2007/0188848 A1 * | 8/2007 | Machida et al. | 359/296 |
| 2007/0200795 A1 | 8/2007 | Whitesides et al. | |
| 2008/0024426 A1 | 1/2008 | Chopra et al. | |
| 2008/0112040 A1 * | 5/2008 | Suwabe et al. | 359/296 |

OTHER PUBLICATIONS

PCT International Search Report and the Written Opinion of the International Searching Authority for PCT/US09/040010, mailed Jul. 23, 2009, 8 pgs.

* cited by examiner

*Primary Examiner* — Dawayne A Pinkney
(74) *Attorney, Agent, or Firm* — K&L Gates LLP

(57) ABSTRACT

A display element is described. The display element includes: a network; a continuous phase; and a discontinuous mobile phase, which is capable of responding to an externally applied electric field such that under influence of the externally applied electric field, without effecting bulk movement of the continuous phase, the mobile phase displaces from one location to another location through or within the network.

A process of manufacturing a display cell is also described. The process includes: obtaining a pair of electrodes; placing a network between the electrodes; assembling the electrodes and the network to form a sub-assembly; and injecting into the subassembly a discontinuous phase.

26 Claims, 7 Drawing Sheets

SYSTEMS, METHODS AND COMPOSITIONS RELATING TO DISPLAY ELEMENTS

BACKGROUND OF THE INVENTION

The present invention relates generally to display elements. More particularly, the present invention relates to display elements that include a network and a mobile phase, which under the influence of an externally applied electric field, displaces from one location to another through or within the network to form part of an image or alternatively, to serve as a light valve for optical switching applications.

Electrophoretic displays enjoy significant advantages over the alternatives of cathode ray tubes (CRTs) and liquid crystal displays (LCDs) particularly for portable display applications. Specifically, electrophoretic displays require significantly less power than the bulky CRTs and provide a wider field of view, provide significantly less undesirable light absorption, and are manufactured at a lower cost than the LCDs. Significantly, electrophoretic displays enable the production of highly transmissive, highly reflective, or "paper-like," displays, which are not achievable with current technologies. For more information on the advantages of electrophoretic displays, reference may be made to U.S. Pat. No. 5,582,700 issued to Bryning et al., which is incorporated herein by reference in its entirety for all purposes.

FIG. 1 shows a prior art display element 10 generally described in U.S. Pat. No. 4,419,663 issued to Kohashi. Display element 10 includes two electrodes 12 and 14, which are shaped like plates and spaced apart to define a space therebetween. Typically, at least one of electrode 12 is transparent, allowing a viewer 20 to view display element 10. Disposed in a portion of the space between electrodes 12 and 14 is ink 16, which is a light transmissive liquid material and impregnated in numerous distinct pores or micropores found in a porous material 18. In this configuration, there exists a gap between electrodes 12 and porous material 18. Ink 16 can be transparent and porous material 18 can be white. Furthermore, the index of refraction of ink 16 and porous material 18 are substantially equal. As a result, when numerous pores inside porous material 18 are completely or almost completely impregnated with ink 16, external light entering through the transparent electrode is not reflected at the contact interface of ink 16 and porous material 18, but is transmitted therethrough to provide a display element which appears to be transparent.

During a typical operation, under the influence of a voltage potential applied by a voltage source 22 through leads 24 and 26 to electrodes 12 and 14, ink 16 electroosmotically moves out of the pores of porous material 18 and moves towards the negatively charged electrode. During such movement, excess ink 16 occupies the gap between electrode 12 and porous material 18. Consequently, voids filled with air exist inside the pores of porous material 18. The presence of air contributes to a mismatch in the index of refraction between porous material 18 and voids inside the pores. As a result, external light, which enters through transparent electrode 12, is reflected to provide a display element which appears to be white. When the electric field is reversed, ink 16 returns to porous material 18 by capillary action, impregnating the porous material.

If a black background is placed underneath the display element, when it is in its transparent state, light entering the display element is absorbed by the black background, and not reflected. The display element with the black background appears black when viewed from the direction of the incident light. With the same black background in place, but when the display element is in its white state, the light entering the display element is reflected from the porous material, and the display element will appear white.

By way of example, FIG. 2 shows an image of a cross (i.e., "+") 50 formed by an electrophoretic display. To form image of a cross 50, certain display elements 52 appear colored black (hereinafter "black elements 52") and certain other display elements 54 contrastingly appear white (hereinafter "white elements 54"). According to the example of FIG. 1 described above, some display elements under the influence of an electric field will appear black (when light is absorbed by the black background), while other display element, at the same time under reversed electric field will appear white (when the porous material is of white color). A combination of these numerous black elements 52 and numerous white display elements 54 together form image of cross 50 shown in FIG. 2.

Unfortunately the described display element found in the prior art suffer from several drawbacks. For example, it takes the ink a relatively long time to return from outside the porous material back into the pores of a porous material through capillary action. As a result, the prior art display elements suffer from poor switching speed. As another example, electroosmotic movement of the ink requires expending significant amount of energy, raising the power requirements for this design of display element. Furthermore, the design is complicated, requiring a gas-containing gap within the display element.

What is, therefore, needed is an improved display element that effectively facilitates the formation of an image, without suffering from the drawbacks, e.g., poor switching speed and high power requirements, encountered by the prior art display elements.

SUMMARY OF THE INVENTION

In view of the foregoing, this invention provides a display element. The display element includes: a network; a continuous phase; and a discontinuous mobile phase, which is capable of responding to an externally applied electric field such that under the influence of the externally applied electric field, without effecting bulk movement of the continuous phase, the mobile phase displaces from one location to another location through or within the network.

The display element may further include a pair of electrodes having disposed therebetween the network, the continuous phase and the discontinuous mobile phase. The mobile phase may perform at least one function selected from a group consisting of absorbing, scattering and emitting light over a range of wavelengths. The continuous phase may transmit light over a range of wavelengths. The network may perform at least one function selected from a group consisting of absorbing, scattering, emitting and transmitting light over a range of wavelengths.

At least one of the pair of electrodes may be transparent such that when the mobile phase under the externally applied electric field is displaced, then light that exits the display element is different from light that enters the display element. Under the influence of an externally applied electric field, the mobile phase may be displaced by either flocculating or dispersing within the network.

In another embodiment of the present invention, under the influence of an externally applied electric field, the mobile phase is displaced at least partially through the network, without flocculating within the network.

The network in conjunction with the mobile phase, which when under the influence of externally applied electric field, may serve to effect at least one function selected from a group consisting of obscuring the mobile phase from field of view, nucleating condensation of the mobile phase, directing motion of the mobile phase, limiting mobility of the mobile phase, making the display bistable, and serving as a light-guide within the display element.

In one embodiment of the present invention, the display cell element includes: a pair of substrates having disposed therebetween the network, the continuous phase and the mobile phase; and a pair of electrodes applied externally to the pair of substrates, such that when an external electric field is applied to the pair of electrodes, the external electric field enables the displacement of the mobile phase.

The display element may serve as part of a display. By way of example, a plurality of display elements may combine to form a display unit of an image. Alternatively, the display element may be used as a light valve or optical switch.

In another aspect, the present invention provides a process of manufacturing a display element. The process includes: obtaining a pair of electrodes; placing a network between the electrodes; assembling the electrodes and the network to form a sub-assembly; and injecting into the subassembly a discontinuous phase. The step of assembling may include installing spacers between the pair of electrodes. The display element manufacturing process may further include evacuating air from inside the sub-assembly to create vacuum inside the sub-assembly. The step of injecting may include injecting a continuous phase into the sub-assembly.

In yet another aspect, the present invention provides a yet another process of manufacturing a display cell. This process includes obtaining a pair of electrodes; assembling the electrodes to form a sub-assembly; and injecting into the subassembly a discontinuous phase and network.

The step of assembling may include installing spacers between the pair of electrodes. In certain embodiments of the present invention, the step of assembling further includes evacuating air from inside the sub-assembly to create vacuum inside the sub-assembly. The step of injecting may include injecting a continuous phase into the sub-assembly.

In yet another aspect, the present invention provides a yet another process of manufacturing a display cell. The display element manufacturing process includes: obtaining a pair of electrodes; applying a continuous phase, a discontinuous phase and network to at least one of the pair of electrodes; and assembling the pair of electrodes such that the continuous phase, the discontinuous phase and the network are disposed between the pair of electrodes.

The step of applying may include rolling or brushing the continuous phase, the discontinuous phase and the network on at least one of the pair of electrodes. The step of applying may include applying spacers to the pair of electrodes such that each of the pair of electrodes is separated from each other by the spacer. In accordance with one embodiment of the present invention, the step of obtaining the pair of electrodes includes: depositing a conductive film on a polymer or glass substrate; and patterning the film into segments to form an electrode. The pair of electrodes may include at least one member selected from a group consisting of indium tin oxide, thin metallic films, thin carbon and thin carbon nanotubes. In certain embodiments of the present invention, the display element fabricating process includes treating by silanization or coating with a hydrophobic monomer, mixture of monomers, polymer or mixture of polymers at least one electrode to provide the network with nanostructure features. At least one of the pair of electrodes may include thin film transistors. The display element manufacturing process may further include using as a sealant fluorinated grease or fluorinated glue.

In yet another aspect, the present invention provides a yet another process for manufacturing an electroresponsive ink. This process includes: obtaining a liquid; obtaining a dye or pigment; and solubilizing in the liquid the dye or the pigment such that in its solubilized state the dye or the pigment is at least one of charged, has a dipole moment, or is polarizable under the influence of an externally applied electric field.

In yet another aspect, the present invention provides a composition of material inside a display unit. The composition includes: a liquid; and a dye or a pigment including at least a portion that is polarizable or has a dipole moment or is charged when the dye or the pigment is in a solubilized state in the liquid.

The composition may further include a network. In one embodiment of the present invention, the liquid is non-polar. In an alternative embodiment of the present invention, the liquid is polar or polarizable. In another alternative embodiment of the present invention, the liquid is electrically insulating. In yet another alternative embodiment of the present invention, the liquid consists of more than one component. In yet another alternative embodiment of the present invention, the liquid contains at least one member selected from a group consisting of: polar solvent, non-polar solvent, organic solvent, inorganic solvent, oil, liquid crystal, block copolymers, surfactants, micelles, particles, polymers, dissolved salts, water, dyes, and ionic liquids.

The network may include at least one material selected from a group consisting of titanium dioxide, aluminum dioxide, metal oxides, barium sulfate, glass (silica) particles, and zeolites. Alternatively, the network may include fibrous networks or fibrous minerals. In certain applications, the fibrous networks may include at least one material selected from a group consisting of glass wool, cotton, nanowires and cellulose, carbon nanotubes, natural fibers and synthetic fibers. In other applications, the fibrous minerals include at least one of talc and silicates. In one embodiment of the present invention, the network includes at least one member selected from a group consisting of chemically crosslinked polymer matrix, physically crosslinked polymer matrix and uncrosslinked polymer matrix. In another alternative embodiment of the present invention, the network is made from a polymer, which includes at least one member selected from a group consisting of polystyrene, silicon dioxide, silicon dioxide derivatives, polyacrylonitrile, polypropylene, liquid crystal polymers, conductive polymers, fluorinated polymers, halogenated polymers, and polymethylsiloxanes.

The network may contain chemical or physical sites to which the dye or the pigment will preferentially move when the display element is subjected to an externally applied electric field. The polymer may have at least one property selected from a group consisting of charged, uncharged, hydrophobic, hydrophilic, randomly oriented and aligned. The network may contain more than one type of component. The network may be made from at least one material selected from a group consisting of micro-fabricated transparent films, micro-fabricated reflective films, micro-fabricated colored films, nano-fabricated transparent films and nano-fabricated reflective films and nanofabricated colored films. The network may include at least one member selected from a group consisting of porous filtration media, porous transparent films and porous reflective films.

The dye or pigment may be solubilized in the liquid with at least one member selected from a group consisting of surfactants, block copolymers, amphiphilic molecules and DNA. In the composition of the present invention, more than one type of dye or pigment may be used. The dye or the pigment may be chemically engineered to be soluble in the liquid by forming conjugates of the dye or the pigment with small molecules or polymeric chains. The dye or the pigment may include at least one member selected from a group consisting of organic dyes, inorganic dyes, ionic dyes, polarizable dyes, quantum dots, organic pigments, metal ions, fluorescent dyes, carbon black, carbon nanotubes, colored silica nanoparticles, colored polymeric nanoparticles, and metallic nanoparticles containing sequestered dye on the interior or on the surface. The dye or the pigment may include at least one member selected from a group consisting of surfactant-stabilized dye complex and polymer-stabilized dye complex.

In one embodiment of the present invention, the liquid includes at least one member selected from a group consisting of xylene, toluene, diethylbenzene, triethylbenzene, trimethylbenzene, iso-octane, decane, undecane, tridecane, phenylhexane, phenylheptane, phenyloctane, phenylnonane, phenyldecane, phenylundecane, dimethylformamide and water. In an alternative embodiment of the present invention, the liquid is an organic, non-conductive liquid, including a non-polar liquid selected from a group consisting of alkanes, alkenes, alkynes and aromatic liquids of any relevant chain length or molecular weight. In yet another embodiment of the present invention, the liquid includes monomeric or polymeric compounds that are linear or branched and include at least one member or derivative thereof selected from a group consisting of alkanes, alkenes, alkynes and aromatic liquids of any relevant chain length or molecular weight.

The composition may further include an additional chemical component used within the liquid, the network, or the dye or pigment. The additional chemical component may include at least one member selected from a group consisting of ionic liquids, salts, polymers, surfactants, aluminum bromide, hexafluorophosphate and tri-n-octylphosphine.

The construction and method of operation of the invention, however, together with additional objects and advantages thereof will be best understood from the following descriptions of specific embodiments when read in connection with the accompanying figures.

DETAILED DESCRIPTION OF THE PREFERRED EMBODIMENTS

In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention.

Figure 3A:
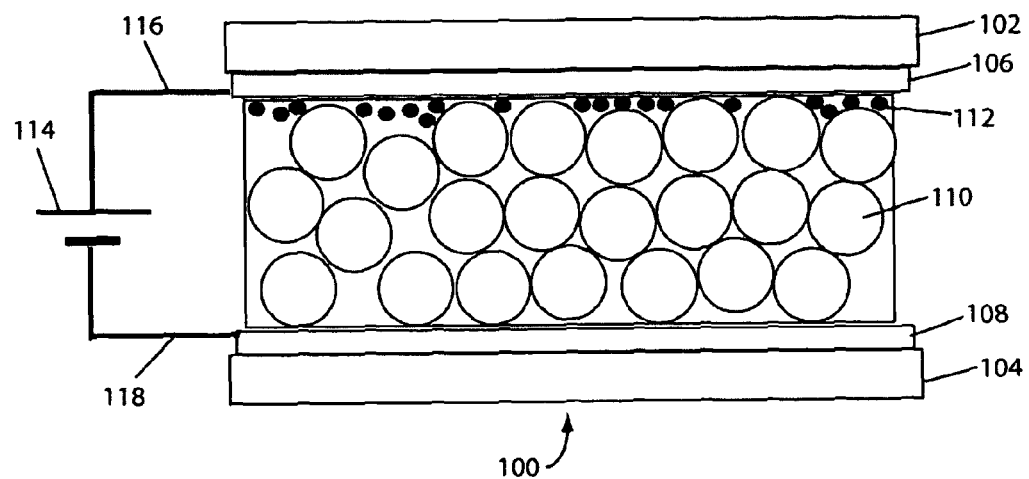
FIG. 3A shows a side-sectional view of a display element, according to one embodiment of the present invention, including a network of spherical particles and a charged mobile phase, which under an electrically applied electric field, displaces through the network to concentrate on an electrode that carries a charge opposite to the charge of the mobile phase.

FIG. 3A shows a display element 100, according to one embodiment of the present invention. Element 100 includes two substrates 102 and 104 having disposed therebetween two electrodes 106 and 108. Electrode 106 is transparent, and therefore, allows natural light inside element 100. A network 110, a continuous phase (not shown to simplify illustration) and a mobile phase 112 are provided between electrodes 106 and 108. As shown in FIG. 3A, network 110 includes reflective spherical particles. In other words, network 110 reflects the natural light entering element 100 through electrode 106. A voltage source 114 is connected through leads 116 and 118 to electrodes 106 and 108, respectively.

Figure 3B:
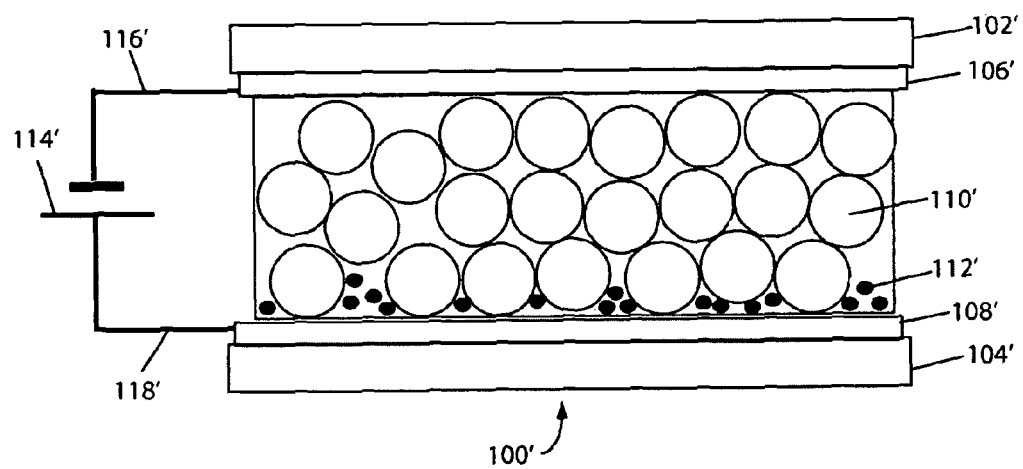
FIG. 3B shows the display element of FIG. 3A under conditions when the applied electric field is reversed and the charged mobile phase displaces to the opposite electrode, which is charged opposite to the charge of the mobile phase.

FIG. 3B shows a display element 100', which is substantially similar in components and their assembly to element 100 of FIG. 3A, except the polarity of voltage source 114' is reversed. In the configuration of FIG. 3B, substrates 102 and 104, electrodes 106 and 108, network 110, continuous phase, and leads 116 and 118 appear in substantially the same configuration as shown in FIG. 3A. The mobile phase 112 in FIG.

3B is displaced from its position in FIG. 3A due to the reversed polarity of the voltage source.

Display element 100 is shown to include two substrates 102 and 104, which are optional. In those embodiments where such substrates are employed, they are made from a rigid or flexible material which provides mechanical support to the display element. By way of example, such substrates are made of glass or polymer. In those embodiments, where one electrode is transparent, such as transparent electrode 106 of FIG. 3A, the substrate adjacent to the transparent electrode is also preferably transparent to allow the natural light into the display element.

Electrodes 106 and 108 can be made from any conductive material that is capable of conducting the charge provided by voltage source 114 during operation. Preferably, however, electrodes 106 and 108 are made from at least one member selected from a group consisting of indium tin oxide (ITO), thin metallic films, conductive polymers, carbon, and carbon nanotubes. Of these materials, indium tin oxide is most commonly used and represents a more preferred embodiment.

In certain embodiments of the present invention, spacing between the electrodes can be controlled by using spacers (not shown to simplify illustration). Appropriately sized particles, when sandwiched between the electrodes, effectively serve as spacers. Typically, such particles are directly deposited on the electrode surface and provide the desired uniform space between the electrodes. Spacing between electrodes can vary depending on the application or design of the display element. Electrode spacing can be, for example, between about 3 microns and about 5 microns. In other instances, spacing between electrodes can be between about 5 microns and about 10 microns. In still other instances, spacing can be between about 10 microns and about 50 microns or more.

Figure 1:
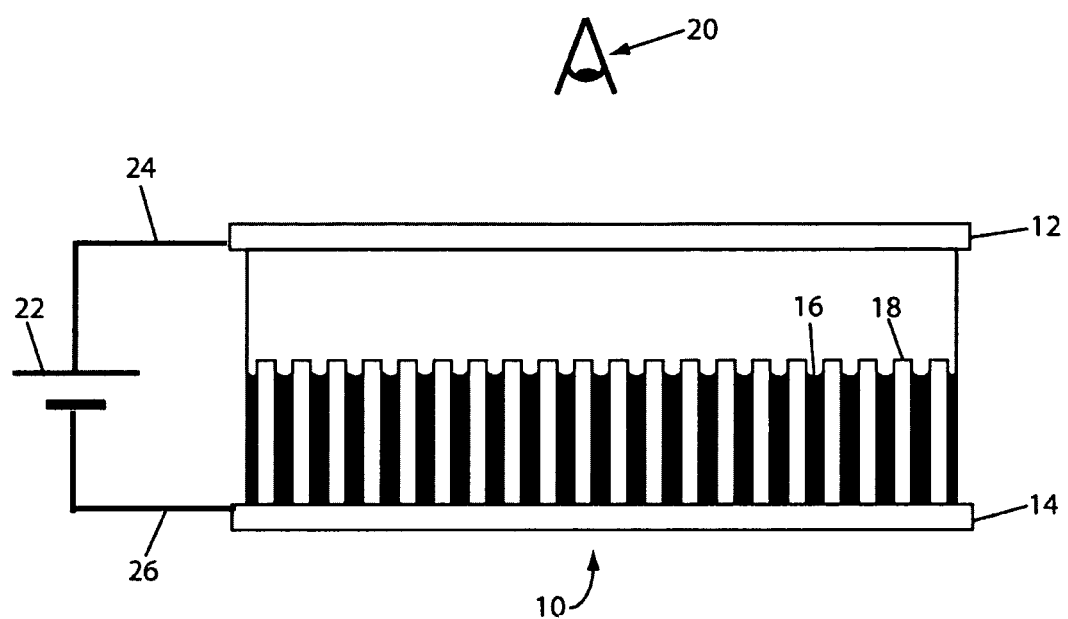
FIG. 1 shows a general representation of a side-sectional view of a display element of an electroosmotic display found in the prior art.

Network 110 in FIG. 1 is shown as spherical particles. However, such particles need not be spherical and can be any shape that serves as a matrix which occupies the space between the electrodes. It is, however, preferable to have network 110 that is packed in such a way as to provide pores of a suitable amount of space for the mobile phase to move through or within the network. In one embodiment of the present invention, such particles are white or some other color. In other embodiments of the present invention, such particles are transparent. Regardless of whether these particles are colored or are transparent, it is not necessary for network 110 to be charged or to be responsive to electric fields to any appreciable extent. According to one embodiment of the present invention, representative materials that are suitable for manufacturing network 110 include at least one material selected from a group consisting of titanium dioxide (i.e., titanium IV oxide), barium sulfate, and zeolites. Furthermore, such particles may be chemically treated, e.g., by silanization or other surface modification well known to those skilled in the art, to provide the desired properties. In certain embodiments, particles that serve as network 110 may also contain nanostructured features. Such nanostructured features may provide at least one of the following: porosity, nucleation sites, surface reactivity, and surface neutrality.

In those embodiments of the present invention where network 110 is designed to be transparent, silicon dioxide or polymers may be used to manufacture the particles which form network 110. Relative to mobile phase 112, these particles may or may not have a significantly different dielectric constant and thus may or may not significantly affect the electric field or index of refraction within the medium. As mentioned above with respect to colored particles, such transparent particles may also undergo chemical treatment e.g., by silanization or other surface modification well known to those skilled in the art, and may also contain nanostructure features.

In an alternative embodiment of the present invention, fibrous networks or matrices (e.g., glass wool, cotton wool, nanowires and cellulose) or fibrous minerals (e.g., talc and silicates) may be used as network 110 in FIG. 3A.

In another alternative embodiment of the present invention, network 110 can be made from at least one member selected from a group consisting of chemically crosslinked polymer matrix, physically crosslinked polymer matrix and uncrosslinked polymer matrix. The polymers used in this embodiment may be charged, uncharged, aligned or randomly oriented. Representative examples of polymers used to make network 110 include at least one member selected from a group consisting of polystyrene, silicon dioxide derivatives (i.e., silica gels), polyacrylonitrile, Teflon, fluorinated polymers, liquid crystal polymers, conductive polymers and polymethylsiloxanes.

In yet another alternative embodiment of the present invention, network 110 is made from at least one member selected from a group consisting of micro-fabricated transparent films, micro-fabricated reflective films, nano-fabricated transparent films and nano-fabricated reflective films. Each of the films may include pores that are any one of conical, tubular or spherical shaped. In this embodiment, other examples of suitable material for making network 110 include porous filtration media (e.g., poly(tetrafluoroethylene) (also known as "PTFE") and cellulose), porous transparent films and porous reflective films. Porous transparent films and porous reflective films may be made through or mediated by the self-assembly of colloidal particles, surfactants, polymers or microparticles.

In one embodiment of the present invention, the combination of mobile phase 112 and continuous phase used in display element 100 of FIG. 3A forms electroresponsive ink. In this embodiment, the continuous phase is a clear or colored liquid and the discontinuous, mobile phase contains a dye or a pigment. In certain embodiments of the present invention, the dye or pigment is stabilized within the continuous phase by surfactants. Those skilled in the art may characterize this ink as an emulsion. When a non-polar liquid is used as the continuous phase in conjunction with a polar mobile phase, then those skilled in the art may characterize the ink as a reverse emulsion. In certain other embodiments of the present invention, the mobile phase is made from molecular or supramolecular complexes which include charged dye or charged pigment. By way of example, these complexes include at least one member selected from a group consisting of chemically bonded polymer-dye conjugate, or a stabilized polymer-dye complex (stabilized via charge-charge interaction or salt bridges), chemically engineered dye or pigment that contains a polar or charged component and a non-polar component, complexes of dye or pigment with non-chemically bonded stabilizing agents such as polymers or, for example, salts. In other embodiments of the present invention, the mobile phase includes colored, or fluorescent or luminescent particles or color-producing nanoparticles. Representative color-producing nanoparticles include quantum dots, dyes embedded in latex, dyes sequestered in glass particles. Alternatively the dyes can associated with the surface of these particles especially when metallic nanoparticles such as gold or silver are used.

The continuous phase and mobile phase 112 together constitute the ink. In those embodiments of the present invention where a non-polar or weakly polar solvent is used as the continuous phase, the discontinuous, mobile phase 112 preferably includes charged, polar, or polarizable dye molecules suspended in a solvent or charged, polar, or polarizable pigment particles suspended in a solvent. The continuous phase may include any number of organic solvents. More specifically, the continuous phase in this embodiment may preferably be an organic non-conductive liquid, comprised of non-polar liquids selected from alkanes, alkenes, alkynes or aromatic liquids (of any relevant chain length or molecular weight). The compounds could be monomeric or polymeric, linear or branched. Each of these classes of molecules could be derivatized with any or all of the others. By way of example, aromatic compounds could be derivatized with alkanes, alkenes, alkynes or aromatic.

In another embodiment of the present invention, continuous phase includes at least one member selected from a group consisting of xylene, toluene, phenols, iso-octane, benzene, decane, undecane, tridecane, phenylhexane, phenylheptane, phenyloctane, phenylnonane, phenyldecane, phenylundecane, phenyldodecane, and related aromatic or aliphatic compounds, or their corresponding halogenated solvents. In alternative embodiments of the present invention, these solvents may further be derivatized with a variety of chemical groups as would be familiar to those skilled in the art. In accordance with one preferred embodiment of the present invention, the continuous phase is oil, such as silicone oil. It is not necessary that the continuous phase be an organic liquid, rather the continuous phase can be any liquid, especially with working voltages inside the liquid's electrochemical window, i.e., a voltage range in which the substance is neither oxidized nor reduced. The continuous phase may be transparent, or may have a color different from the mobile phase. Note that the continuous phase could be saturated with dispersed, monomeric components or fractions of the dispersed phase. Surfactants, polymers, ionic liquids, salts, or other chemical compounds could for example therefore represent a large part of the continuous phase.

In an alternative embodiment, the continuous phase may be polar or polarizable. Examples of such a continuous phase include the aforementioned classes of liquids that are fully or partially derivatized with halogens and or heteroatoms such as O, N, S. P, Si, or other atoms selected from groups V, VI from the periodic table. Each of these atoms may also be at a higher oxidation state, as for example: alcohols, carbonyls, carboxyls, nitrites, nitro, nitroso, n-oxide, oximes, sulfoxide, sulfones, sulfates, phosphine oxides, phosphonates and phosphates. The continuous phase could also be partially charged by ionization of the functional groups such as ammonium, iminiums, sulfonates, sulfates, phosphates, phosphonates or carboxylates. In general, the continuous phase preferably has a high boiling point and preferably has a very low freezing point, and preferably has low volatility.

The mobile phase 112 is preferably a colored droplet or a particle smaller than one micron. In alternative embodiments of the present invention, the particle is smaller than 500 nm or even smaller, i.e., smaller than 50 nm. Such small particles used in the display elements of the present invention easily move through or within network 110 and do not readily sediment under gravity as encountered with heavier particles used in the prior art display elements.

Figure 2:
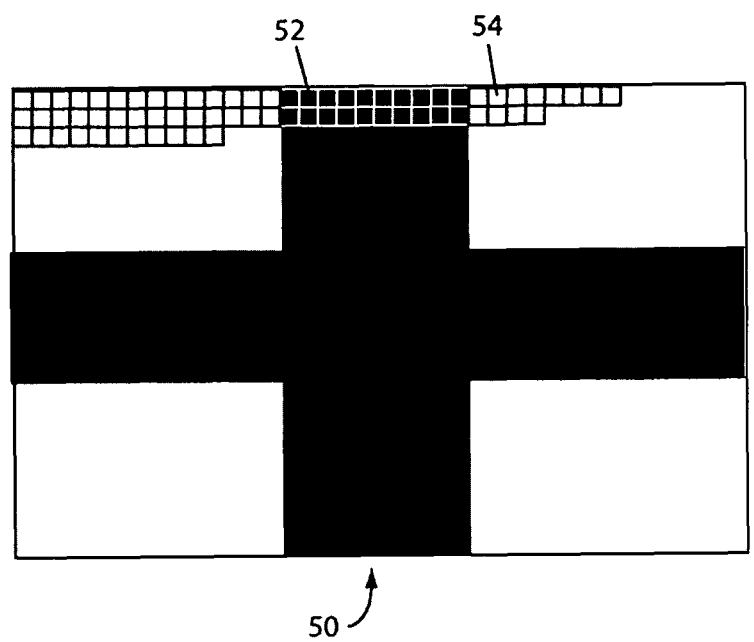
FIG. 2 shows an image of a cross "+" formed by a multitude of display elements.

In accordance with one embodiment of the present invention, operation of display cell 100 of FIG. 3A begins when voltage source 114 is powered up and an electric field is applied to electrodes 106 and 108. Under the influence of this electric field, charged mobile phase 112 physically moves within network 110 and through the continuous phase. Such movement by charged mobile phase 112 is attributed to electrophoretic forces. The mobile phase migrates towards the electrode, which is charged oppositely to the ink, and concentrates there. In the example of FIG. 3A, electrode 106 is transparent and carries a charge opposite to that of the mobile phase under the influence of an electric field. As a result, electrode 106 is rich with mobile phase 112 while electrode 108 is depleted of the mobile phase. In this embodiment, transparent electrode 106 of display element 100 provides the color of mobile phase 112. Under the influence of the same electric field, if electrode 108 is also transparent, if network 110 is made from reflective spherical particles (e.g., made from titanium dioxide), if the continuous phase is transparent, if the mobile phase is colored, and display element 100 is viewed from the opposite side (i.e., through electrode 108 of FIG. 3A), then the display element will appear to have the color of network 110 (e.g., a white color of the titanium dioxide). Those skilled in the art will recognize that in the embodiment of FIG. 3A and under the influence of an electric field, electrode 106 contributes the color of the mobile phase to form a portion of the image. Similarly, a display element can be designed to use electrode 108 as the transparent electrode so that it under similar circumstances can contribute the color of the network to form a portion of another image. Furthermore, by selecting the appropriate color for the mobile phase and the network, numerous display elements can be selectively used as described above to form the desired image (e.g., the image of a cross, "+," shown in FIG. 2).

Under conditions of reversed electric field, as shown in FIG. 3B, charged mobile phase 112 migrates to the opposite electrode, e.g., electrode 108 in FIG. 3B that is charged opposite to the mobile phase. In this configuration, the display element, when viewed from the side of electrode 106 will appear to take on the color of the network, and when viewed from the side of electrode 108, will appear to have the color of the mobile phase.

Figure 4A:
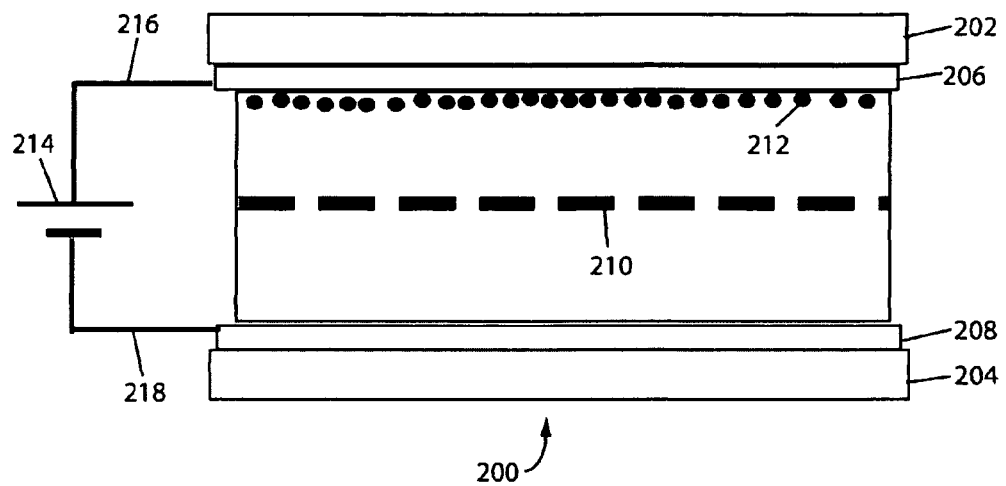
FIG. 4A shows a side-sectional view of a display element, according to an alternative embodiment of the present invention, including a porous membrane as a network within the display element and through which a charged mobile phase, under an externally applied electric field, is displaced to concentrate near an electrode that carries a charge opposite to that of the mobile phase.

FIG. 4A shows a display element 200, which has components (i.e., substrates 202 and 204, electrodes 206 and 208, mobile phase 212, continuous phase, voltage source 214, leads 216 and 218) corresponding to those found in FIG. 3A (i.e., substrates 102 and 104, electrodes 106 and 108, mobile phase 112, continuous phase, voltage source 114, leads 116 and 118). Instead of using particles to serve as network 110 as shown in FIG. 3A, the embodiment of FIG. 4A shows that at least one porous, reflective or colored membrane serves as the network 210.

Figure 4B:
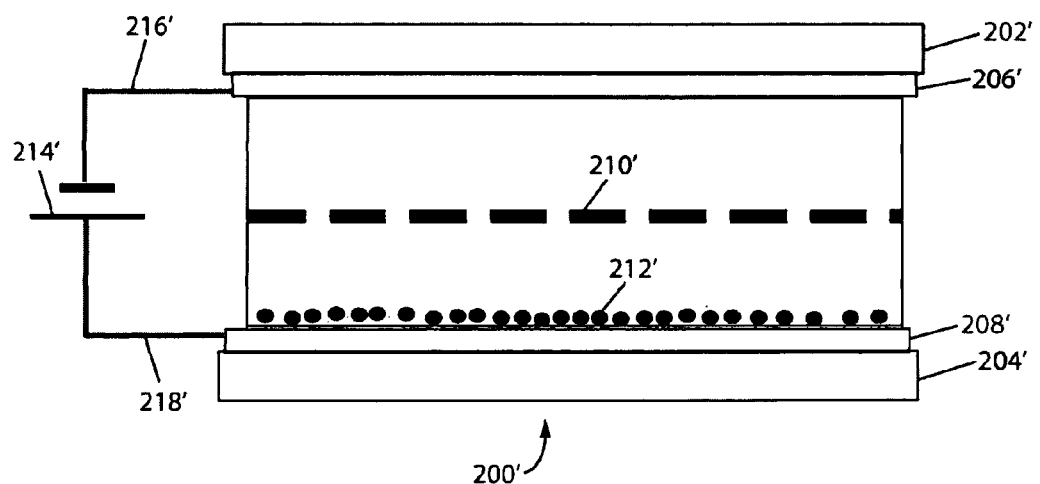
FIG. 4B shows the display element of FIG. 4A under conditions when the applied electric field is reversed and the charged mobile phase displaces to the opposite electrode, which is charged opposite to the charge of the mobile phase.

FIG. 4B shows a display element 200', which is substantially similar in components and their assembly to element 200 of FIG. 4A, except the electric field generated by voltage source 214' is reversed. Substrates 202 and 204, electrodes 206 and 208, network 210, continuous phase, and leads 216 and 218 shown in FIG. 4A appear in substantially the same configuration as they do in FIG. 4B. The mobile phase 212 in FIG. 4B is displaced from its position in FIG. 4A due to the reversed polarity of the voltage source.

In the embodiment shown in FIG. 4A, under the influence of an electric field, charged mobile phase 212 physically moves through network 210, i.e., shown as porous membrane in FIG. 4A, by electrophoretic forces towards electrode 206, which is charged opposite to the mobile phase. As a result, the region of the display element between electrode 206 and network 210 is rich with the mobile phase while the region of the display element between electrode 208 and network 210 is depleted of the mobile phase. At electrode 206, charged mobile phase may further concentrate and spread out along the length and width of the electrode. When display element is viewed through transparent electrode 206, it displays the color of the mobile phase. If electrode 208 is transparent, if the continuous phase is also transparent, and display element 200 is viewed from the opposite side (i.e., through electrode 208 of FIG. 4A), then the electrode 208 displays the color of the porous membrane.

Under conditions of reversed electric field as shown in FIG. 4B, mobile phase 212 migrates to the opposite region of the display element, i.e., the region between network 210 and electrode 208. In this configuration, if the continuous phase is transparent, electrode 206 will display the color of network while electrode 208, if transparent, will display the color of the mobile phase.

Figure 5A:
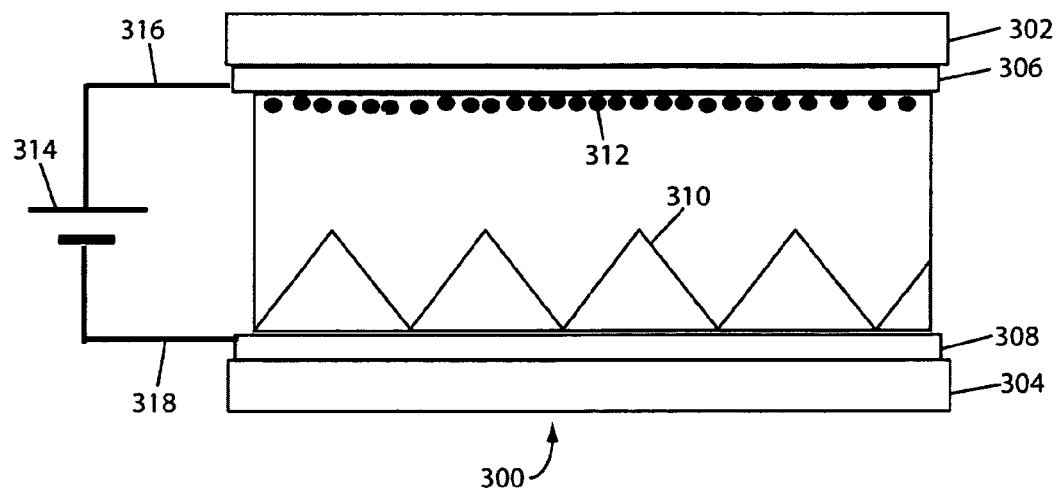
FIG. 5A shows a side-sectional view of a display element, according to another alternative embodiment of the present invention, including a network of conical wells and a charged mobile phase, which under an externally applied electric field, is displaced through the network to concentrate on and spread out along a length of an electrode that carries a charge opposite to the charge of the mobile phase.

Similar to FIG. 4A, FIG. 5A also has some of the same components as found in FIG. 3A. In FIG. 5A, display element 300 includes substrates 302 and 304, electrodes 306 and 308, mobile phase 312, continuous phase, voltage source 314, leads 316 and 318 similar to their corresponding components found in FIG. 3A (i.e., substrates 102 and 104, electrodes 106 and 108, mobile phase 112, continuous phase, voltage source 114, leads 116 and 118). Instead of using particles to serve as network 110 as shown in FIG. 3A, the embodiment of FIG. 5A shows that an array of patterned wells serves as the network 310.

Figure 5B:
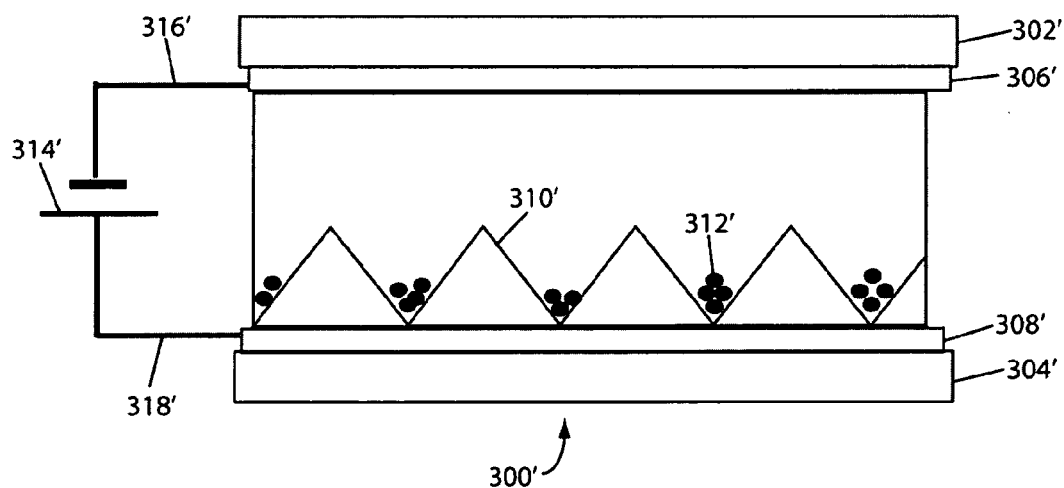
FIG. 5B shows the display element of FIG. 5A under conditions when the applied electric field is reversed and the mobile phase displaces to the opposite electrode, which is charged opposite to the charge of the mobile phase.

FIG. 5B shows a display element 300', which has substantially similar components as element 300 shown in FIG. 5A, except the electric field of voltage source 314' in FIG. 3B is reversed relative to that of voltage source 314 of FIG. 3A. Substrates 302 and 304, electrodes 306 and 308, network 310, continuous phase, leads 316 and 318 shown in FIG. 5A appear in substantially the same configuration in FIG. 5B. The mobile phase 312 in FIG. 5B is displaced from its position in FIG. 3A due to the reversed polarity of the voltage source.

Although patterned wells 310 shown in FIGS. 5A and 5B can be reflective like network 110 and 210 as shown in FIGS. 3A and 4A, respectively, it is preferable that wells 310 are transparent. In such preferred embodiments of the present invention, mobile phase 312, under the influence of an electric field, electrophoretically moves towards electrode 306, which is charged opposite to mobile phase 312. Furthermore, charged mobile phase 312 spreads out, along the length and width of electrode 306 and concentrates there as shown in FIG. 5A. As a result, electrode 306 displays the color of the mobile phase.

Under conditions of reversed electric field as shown in FIG. 5B, mobile phase 312 migrates to electrode 308, which has disposed thereon patterned wells 310. In this configuration, mobile phase 312 concentrates inside the conical cavity of patterned wells 310, as opposed to being spread out as shown in FIG. 5A. As a result, color contribution by mobile phase 312 is limited, and the color of patterned wells 310 is expressed as the color of display element 300'. In those preferred embodiments where patterned wells 310 are transparent and the continuous phase is also transparent, display element 300' appears transparent as well.

Figure 6A:
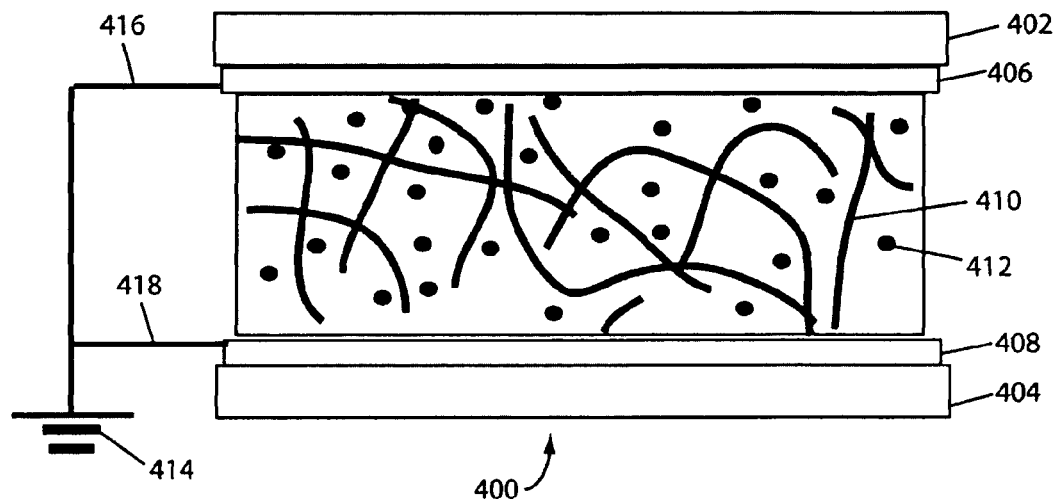
FIG. 6A shows a side-sectional view of a display element, according to a yet another alternative embodiment of the present invention, including a polymer network disposed within the display element and a polarizable mobile phase that is dispersed through the network in the absence of an electric field.

While wishing to not be bound by theory, FIGS. 3A, 3B, 4A, 4B, 5A and 5B show that the charged mobile phase, under the influence of an electric field, undergoes electrophoretic movement. It is, however, not necessary that the mobile phase be charged under the influence of an electric field for it to move from one location to another as described in the present invention. FIG. 6A shows dielectrophoretic addressing, where under the influence of an electric field, at least a component of the mobile phase is polarizable and capable of movement from one location to another. Importantly, however, in the present invention, the mobile phase, as a whole, need not be charged to effect movement under the influence of an electric field.

Figure 6B:
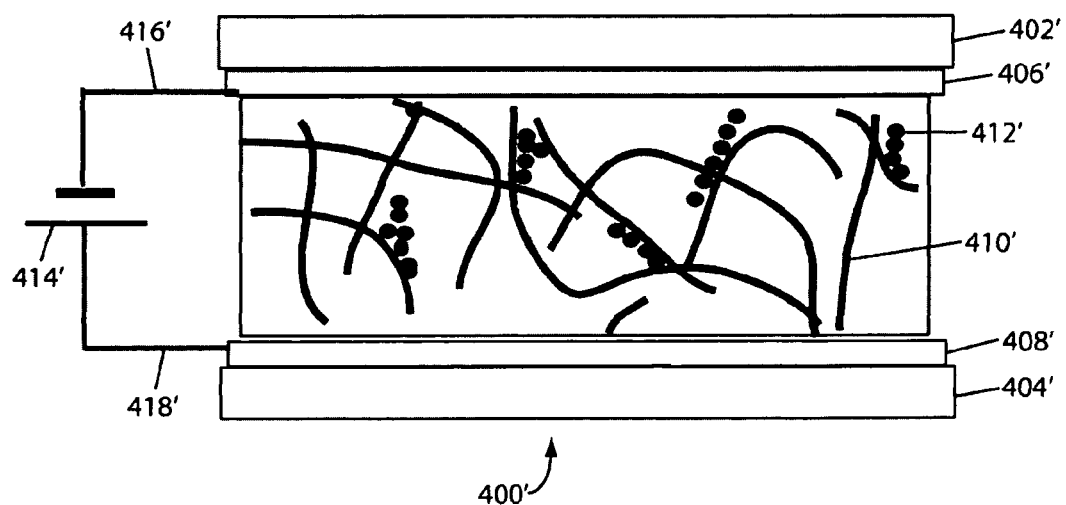
FIG. 6B shows the display element of FIG. 6A when the polarizable mobile phase, under an externally applied electric field, displaces to an area of the locally strongest electric field and agglomerates to form structures resulting from dipole-dipole interactions between components of the polarized mobile phase.

FIG. 6A shows display element 400, which has components assembled in substantially the same configuration as display element 200 of FIG. 3A. Display element 400 includes substrates 402 and 404, electrodes 406 and 408, network 410, continuous phase, mobile phase 412, leads 416 and 418 as their counterparts are shown in FIG. 3A. Instead of a voltage source in the dispersed (off) state, leads 416 and 418 in FIG. 6A are shown connected to ground 414. Similarly, FIG. 6B also contains components described above in the same configuration as shown in FIG. 6A, except display element 400' includes a voltage source 414' performing under conditions of an applied external electric field. In FIGS. 6A and 6B, network 410 is preferably a polymer network.

Under the influence of an electric field, at least a part of mobile phase 412' is polarized, causing the mobile phase to migrate to an area of the strongest electric field. In such areas of the strongest electric field, the mobile phase aligns to form a columnar structure due to dipole-dipole interactions. In this columnar arrangement, the mobile phase is invisible or nearly invisible to the human eye and the color of the polymer network 410' or the continuous phase is displayed as the color of display element 400'.

When the electric field is removed as shown in FIG. 6A, mobile phase is spread out through and within the polymer network and the color of mobile phase 412 is displayed as the color of display element 400.

Regardless of whether the mobility of the charged discontinuous, mobile phase is attributed to electrophoretic or dielectrophoretic addressing, those skilled in the art will recognize that by applying and reversing, or, in the alternative, not applying an electric field to the assemblies described in FIGS. 3A, 3B, 4A, 4B, 5A, 5B, 6A and 6B, the color of the display elements can be selectively changed to form a desired image. Significantly, in the present invention, when an external electric field is applied, the discontinuous, mobile phase moves from one location to another, without effecting bulk movement of the continuous phase. The electrophoretic or dielectrophoretic addressing described in the present invention, as a result, does not suffer from the drawbacks encountered by electroosmotic addressing as disclosed in U.S. Pat. No. 4,419,663 to Kohashi. Specifically, under the influence of an electric field, a display element modulates the entering natural light (e.g., impacts the intensity, reflectivity or transmissivity of natural light) by movement of the mobile phase, without effecting bulk movement of the continuous phase. Consequently, the poor switching speeds and high power requirements encountered to carry out electroosmotic movement of the continuous phase along with the discontinuous, mobile phase are minimized.

For dielectrophoretic addressing as shown in FIG. 6A, a polymer network is employed. The polymer network contains sites that the mobile phase preferentially moves toward under an externally applied electric field, and aggregated structures then form upon these sites. These sites consist of features on the polymer network that are similar in polarity, charge, or geometry to the mobile phase. When the porosity of the polymer network is not much larger than the size of the mobile phase, the presence of the network also prevents or reduces long range drift of the mobile phase by diffusion or any unwanted electrophoretic motion due to, for example, unwanted field non-uniformity.

In the present invention, electrophoretic addressing, i.e., movement of charged mobile phase under the influence of an electric field, allows a display element to effectively function in at least two different states of stability. By way of example, in FIG. 4A where a porous membrane 210 serves as the network disposed between two electrodes, a first state includes the condition when application or removal of the external electric field changes the color of the pixel. When an external electric field is applied, the charged mobile phase moves through the porous membrane to collect and concentrate on the side of the membrane that is charged opposite to the mobile phase. If the mobile phase concentrates on the side of the transparent electrode (e.g., electrode 206 of FIG. 4A), then display element 200 will display the color of the mobile phase. If the external electric field is removed, the mobile phase disperses throughout the continuous phase and a portion of the mobile phase moves to the other side of the porous membrane. Since the concentration of the mobile phase is reduced near the electrode 206 the color intensity of the display element 200 will change.

In a second state, when the electric field is turned off, the charged mobile phase does not have sufficient energy to move through to the other side of the membrane, i.e., to the side of the opposite electrode 208. Instead, the charged mobile phase is scattered between the membrane and transparent electrode 206. As a result, the display element continues to display the color of the mobile phase even though the voltage source has been turned off and there is an absence of an electric field. If an electric field is then applied in the opposite direction, the mobile phase will then have sufficient energy to move through to the other side of the membrane, i.e., to the side of the opposite electrode 208, and the color of the display element will then be the color of the membrane. To those skilled in the art, this second state is frequently referred to as "bistability," and a display operating in this state is called a "bistable" display.

In another example, the two different states of the electric field in the embodiment FIG. 4B are considered. In this embodiment, in a new first state when the electric field is reversed, the charged mobile phase moves through the porous membrane towards the opposite electrode, e.g., electrode 108, and concentrates on the opposite side of the membrane near the opposite electrode. In this configuration, the display element 200' will appear to have the color of the porous membrane. In a second state, when the electric field is turned off, the mobile phase, however, does not have sufficient energy to go back through to the other side of the membrane, i.e., on the side of the electrode 206. Instead, the mobile phase is scattered between the membrane and the electrode 208. As a result, the display element continues to display the color of the porous membrane in the absence of an electric field.

In both examples of FIGS. 4A and 4B mentioned above, there are two different states of stability. In these examples, certain properties of the membrane (e.g., pore size, thickness, surface chemistry) and of the mobile phase (e.g., size, charge, surface chemistry) will determine whether the display element will function in the first state (when an image is retained only under a continuously applied external electric field) or in the second state (i.e., bistable state; when an image is retained with or without a continuously applied external electric field.) Regardless of whether the display functions the first state or the second state, in FIG. 4A, the color of the mobile phase is expressed as the color of the display element. Similarly, in FIG. 4B, the color of the porous membrane is expressed as the color of the display element in both the first state and in the second state. Embodiments of the present invention, which rely upon electrophoretic addressing, are ideally suited for low-power applications, such as e-paper, e-book, and signage.

Display elements of FIGS. 6A and 6B where image formation relies upon dielectrophoretic addressing, i.e., movement of mobile phase having a polarizable component under the influence of an electric field, are ideally suited for fast response applications, e.g., laptops and television. However, either electrophoretic or dielectrophoretic addressing, or a combination of both, may be used for either fast response or for low-power applications.

Figure 7A:
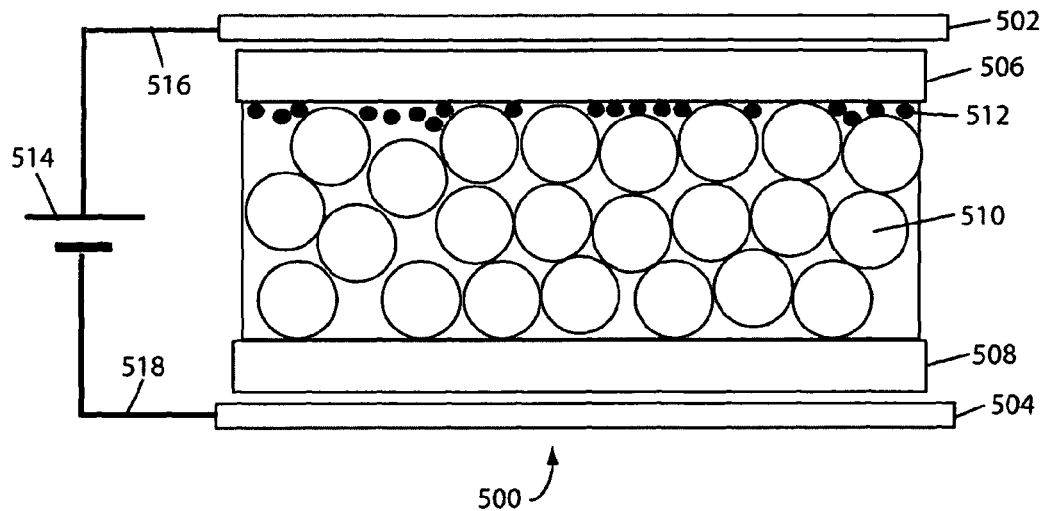
FIG. 7A shows a side-sectional view of a display element that is substantially shown in FIG. 3A, except that the network and mobile phase are contained inside two sheets of substrate, all of which assemble to form a "pouch" that is permanently or, in the alternative, removably attached to the two electrodes.

Regardless of whether electrophoretic or dielectrophoretic addressing is effected, it is not necessary that substrate 202 and 204 be disposed outside and connected to leads 216 and 218 as shown in FIG. 3A. In fact, FIG. 7A shows a design of display element 500 where electrodes 506 and 508 are disposed outside a "pouch," which includes substrates 502 and 504 having disposed therebetween a network, e.g., network 510 of particles as shown in FIG. 3A, a continuous phase (not shown to simplify illustration), a mobile phase 512. A voltage source 514 through leads 516 and 518 connected to electrodes 506 and 508, engages externally with the pouch. It is possible that to manufacture display element 500, the "pouch" subassembly and the electrodes, leads and voltage source subassembly can be manufactured separately, but in parallel. Once the sub-assemblies are complete, they can be easily assembled together as mentioned above to form display element 500.

Figure 7B:
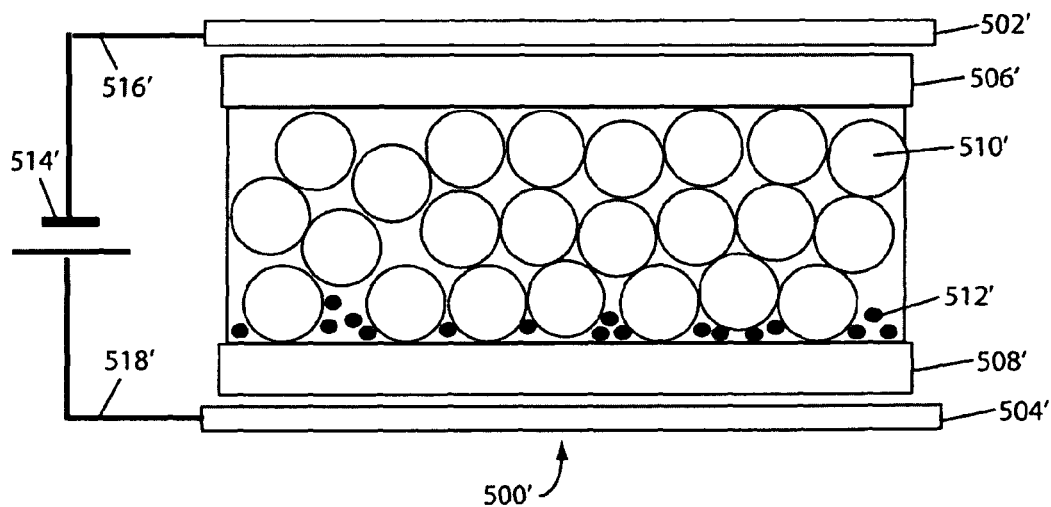
FIG. 7B shows a side-sectional view of the display element shown in FIG. 7A under conditions when the applied electric field is reversed and the charged mobile phase displaces to the opposite electrode, which is charged opposite to the charge of the mobile phase.

Those skilled in the art will recognize that FIG. 7B includes components in the same configuration as FIG. 7A, except display element 500' includes voltage source 514' operating under conditions of a reversed electric field relative to voltage source 514 of FIG. 7A. The operation of display elements 500 and 500' are substantially similar to the described operation of display elements 100 and 100', respectively.

In display elements of the present invention, the presence of a network between the electrodes provides a significant advantage over the display elements of the prior art. Specifically, a network in conjunction with the mobile phase, which under the influence of an externally applied electric field, serves to effect at least one function selected from a group consisting of obscuring the mobile phase from field of view (e.g., porous membrane 210 obscures mobile phase 212 in FIG. 3B), nucleating condensation of the mobile phase (e.g., polymer network in FIGS. 6A and 6B contains sites that the mobile phase preferentially moves toward under an externally applied electric field, and forms agglomerated structures upon these sites); directing motion of the mobile phase (e.g., conical cavities of patterned wells 310 direct the motion of mobile phase 312 to concentrate into small regions at the bottom of the wells in FIG. 5B); limiting mobility of the mobile phase (e.g., the polymer network in FIGS. 6A and 6B prevents the mobile phase from diffusing distances much greater than the pore size of the network), making the display bistable (e.g., porous membrane 210 shown in FIGS. 4A and 4B and particle network 110 in FIGS. 3A and 3B provide bistable addressing); and provides a flexible film that simplifies manufacturing of flexible display. This film or pouch that packages the network and ink can easily be integrated with roll-to-roll manufacturing processes of flexible displays.

Display elements of the present invention can be manufactured according to numerous methods. In one embodiment of the present invention, the process begins when a pair of electrodes is obtained. In an alternative embodiment of the present invention, electrodes 106 and 108 are manufactured by first depositing a film on a polymer or glass substrate, and then patterning the film into pixels or segments depending on the type of display element that is ultimately desired. In another alternative embodiment of the present invention, electrodes 106 and 108 are designed to include thin film transistors (TFTs) which provide the electrodes with active addressing capability. Active addressing provides an x-y addressing scheme such that a charge is stored within each display element to provide a more constant external electric field while other display elements are being addressed.

A network is then placed between the electrodes. Next, the electrodes and network are assembled to form a subassembly. By way of example, two electrodes containing the network may be assembled by applying adhesives to the electrode edges to bind them together. Into this subassembly, a continuous phase and a mobile, discontinuous phase are injected. In those embodiments where spacers are desired, the spacers are provided between the electrodes before forming the subassembly.

In an alternative embodiment of the present invention, the process of forming a display element begins with obtaining a pair of electrodes. Next the mobile phase and network are applied to the at least one of the electrodes. If a continuous phase and spacers are deemed necessary, then they are also applied in this step. In a next step, the electrodes with the above-described materials disposed therebetween are assembled to form a sub-assembly.

The step of applying the network, the mobile phase and the optional continuous phase and spacers is preferably carried out by first forming a paste and then applying that paste using rollers or brushes to at least one of the electrodes. This method of applying the network is preferred for the production of flexible display elements. Those skilled in the art may recognize this process as applicable for roll-to-roll processing.

The present invention envisions using electroresponsive ink that is disposed between the electrodes for electrophoretic and dielectrophoretic addressing. The electroresponsive ink includes a continuous phase and a discontinuous, mobile phase. Under the influence of an electric field, the mobile phase moves from one location to another as described above in the description of various embodiments. Electroresponsive ink is formed by obtaining a liquid and a dye or pigment. In a next step, the dye or pigment is solubilized in the liquid such that in its solubilized state, the dye or pigment is capable of being at least one of charged, having a dipole moment or being polarizable. The mobile phase can move separately from the continuous phase when under the influence of an externally applied electric field. This can be achieved by making the continuous and mobile phases immiscible by using a combination of polar and non-polar liquids, or liquids that are polar to a different degree, or liquids that become immiscible when under an external electric field, or by applying certain processes (e.g., high-shear emulsification) or chemical agents (e.g., encapsulating shells or surfactants) that would prevent the mobile and continuous phases from being miscible with each other. Alternately, the mobile phase can be a particle, or a stable molecular or super-molecular complex that is insoluble within the continuous phase, at least when under the influence of an external electric field. It is preferred that the continuous phase is electrically insulating or weakly conductive. The dye or pigment includes a portion that is polarizable or has a dipole moment or is charged in its solubilized state in the presence of an externally applied electric field.

The methods and processes of the present invention represent a marked improvement over the prior art. By way of example, prior art display elements enjoy a reflectivity of about 6 to about 10%. Display elements according to the present invention enjoy reflectivities ranging from about 70%. As another example, the prior art display elements require numerous films and filters, e.g., color filter protective film, color filter, orientation film, liquid crystals, light diffusion, light guide for backlighting, all of which are not necessary to make display elements of the present invention. As a result, the display elements of the present invention represent a simpler design in which materials costs are reduced by 60%.

It should be noted that a display element need not equal one pixel, which is well known to those skilled in the art as an image unit. Rather, more than one display unit could combine to form a pixel and therefore a pixel could span more than one boundary of a display element. It is also not necessary that a pixel include a whole number of display elements. Rather it is plausible that a pixel include both whole number and a fraction of display elements.

Although illustrative embodiments of this invention have been shown and described, other modifications, changes, and substitutions are intended. By way of example, display elements of the present invention can be used as a light valve, and not be used to form an image. In such embodiments, the display element serves as an optical switch to route light (e.g., between fiberoptic cables in telecommunications applications or within light guides), or to change the transmissivity of surfaces (e.g., in self-dimming windows or sunglasses). The advantages of electrophoretic display elements in these applications include lower cost to manufacture, higher switching efficiency, and low power consumption. Accordingly, it is appropriate that the appended claims be construed broadly and in a manner consistent with the scope of the disclosure, as set forth in the following claims.

What is claimed is:

1. A display element, comprising:
an open-structured network defining a plurality of open structures;
a continuous phase;
a discontinuous mobile phase comprising a polarizable component, wherein said polarizable component is dielectrophoretically addressable via an externally applied electric field such that under influence of said externally applied electric field, without effecting bulk movement of said continuous phase, said mobile phase displaces from one location to another location through or within said plurality of open structures of said open-structured network, and wherein said displacement comprises a dielectrophoretic component of motion.

2. The display element of claim 1, wherein a plurality of said display elements combine to form a display unit of an image.

3. The display element of claim 1, further comprising a pair of electrodes having disposed therebetween said network, said continuous phase and said discontinuous mobile phase.

4. The display element of claim 1, wherein said mobile phase performs at least one function selected from a group of absorbing, scattering and emitting light over a range of wavelengths and said continuous phase transmits light over a range of wavelengths.

5. The display element of claim 1, wherein said display element serves as a light valve or optical switch.

6. The display element of claim 1, wherein said network performs at least one function selected from a group consisting of absorbing, scattering, emitting and transmitting light over a range of wavelengths.

7. The display element of claim 3, wherein at least one of said pair of electrodes is transparent such that when said mobile phase under influence of said externally applied electric field displaces, then light that exits said display element is different than light which enters said display.

8. The display element of claim 1, wherein under influence of said externally applied electric field, said mobile phase is displaced by either flocculating or dispersing within said open-structured network.

9. The display element of claim 1, wherein under influence of said externally applied electric field, said mobile phase displaces at least partially through said network, without flocculating within said open-structured network.

10. The display element of claim 1, wherein said open-structured network in conjunction with said mobile phase, which being under said externally applied electric field, serves to effect at least one function selected from a group consisting of obscuring said mobile phase from field of view, nucleating condensation of said mobile phase, directing motion of said mobile phase, limiting mobility of said mobile phase, making the display bistable, and serving as a light-guide within said display element.

11. The display cell element of claim 1, further comprising:
a pair of substrates having disposed therebetween said open-structured network, said continuous phase and said mobile phase; and
said pair of electrodes applied externally to said pair of substrates, such that when an external electric field is applied to said pair of electrodes, said external electric field enables said displacement of said mobile phase.

12. A process of manufacturing a display cell, comprising:
obtaining a pair of electrodes;
placing a film comprising an open-structured network between said electrodes, wherein said open-structured network defines a plurality of open structures, and wherein said placing comprises applying said film to at least one of said pair of electrodes;
assembling said electrodes and said open-structured network to form a sub-assembly, wherein said assembling comprises applying an adhesive to bind said pair of electrodes having said open-structured network disposed therebetween;
injecting into said subassembly, between said pair of electrodes, a discontinuous phase comprising a polarizable component, wherein said polarizable component is dielectrophoretically addressable via an externally applied electric field generated between said pair of electrodes such that under the influence of said externally applied field, said mobile phase is displaceable through or within said plurality of open structures of said open-structured network, and wherein said displacement comprises a dielectrophoretic component of motion.

13. The process of claim 12, wherein said process of assembling includes installing spacers between said pair of electrodes.

14. The process of claim 12, wherein said injecting includes injecting a continuous phase into said sub-assembly.

15. A process of manufacturing a display cell, comprising:
obtaining a pair of electrodes;
assembling said electrodes to form a sub-assembly;
injecting into said subassembly, between said pair of electrodes, a discontinuous phase and an open-structured network comprising a plurality of open structures;
establishing a separation distance between said pair of electrodes of said sub-assembly between less than 20 microns and about 3 microns, said open-structured network and said discontinuous phase disposed within said separation distance, wherein said discontinuous phase comprises a polarizable component, and wherein said polarizable component is dielectrophoretically addressable via an externally applied electric field generated between said pair of electrodes to displace said discontinuous phase through or within said plurality of open structures of said open-structured network.

16. The process of claim 15, wherein said assembling includes installing spacers between said pair of electrodes.

17. The process of claim 15, further comprising evacuating air from inside said sub-assembly to create vacuum inside said sub-assembly.

18. The process of claim 15, wherein said injecting includes injecting a continuous phase into said sub-assembly.

19. A process of manufacturing a display cell, comprising:
obtaining a pair of electrodes;
applying a paste comprising a continuous phase, a discontinuous phase and an open-structured network to at least one of said pair of electrodes, said open-structured network comprising a plurality of open structures; and
assembling said pair of electrodes such that said continuous phase, said discontinuous phase and said open-structured network are disposed between said pair of electrodes, wherein said discontinuous phase comprises a polarizable component, wherein said polarizable component is dielectrophoretically addressable via an externally applied electric field generated between said pair of electrodes to displace said discontinuous phase through or within said plurality of open structures of said open-structured network.

20. The process of claim 19, wherein said applying includes rolling or brushing said paste comprising said continuous phase, said discontinuous phase and said open-structured network on at least one of said pair of electrodes.

21. The process of claim 19, wherein said applying includes applying spacers to said pair of electrodes such that each of said pair of electrodes is separated from each other by a separation distance between less than 20 microns and about 3 microns by said spacers.

22. The process of claim 19, wherein said obtaining said pair of electrodes includes:
depositing a conductive film on a polymer or glass substrate; and
patterning said film into segments to form an electrode.

23. The process of claim 19, wherein said pair of electrodes includes at least one member selected from a group consisting of indium tin oxide, thin metallic films, thin carbon and thin carbon nanotubes.

24. The process of claim 19, further comprising treating by silanization or coating with a hydrophobic monomer, mixture of monomers, polymer or mixture of polymers said at least one material to provide network with nanostructure features.

25. The process of claim 19, wherein at least one of said pair of electrodes includes thin film transistors.

26. The process of claim 19, further comprising using as a sealant a fluorinated grease or fluorinated glue.

* * * * *